(12) United States Patent
Weslati et al.

(10) Patent No.: US 9,150,214 B2
(45) Date of Patent: Oct. 6, 2015

(54) TECHNIQUES FOR ROBUST PARK LOCK CONTROL

(71) Applicants: Feisel Weslati, Troy, MI (US); Behrouz Ashrafi, Northville, MI (US); Chandan Lakshmanaiah, Troy, MI (US); Salim Hamam, Dearborn Heights, MI (US)

(72) Inventors: Feisel Weslati, Troy, MI (US); Behrouz Ashrafi, Northville, MI (US); Chandan Lakshmanaiah, Troy, MI (US); Salim Hamam, Dearborn Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 93 days.

(21) Appl. No.: 13/945,039

(22) Filed: Jul. 18, 2013

(65) Prior Publication Data
US 2015/0025750 A1    Jan. 22, 2015

(51) Int. Cl.
*B60R 22/00* (2006.01)
*E05F 15/00* (2015.01)
*G05D 1/00* (2006.01)
*G05D 3/00* (2006.01)
*G06F 7/00* (2006.01)
*G06F 17/00* (2006.01)
*B60W 10/18* (2012.01)
*B60W 10/11* (2012.01)
*F16H 63/48* (2006.01)

(52) U.S. Cl.
CPC ............. *B60W 10/182* (2013.01); *B60W 10/11* (2013.01); *F16H 63/48* (2013.01)

(58) Field of Classification Search
CPC ......... F16H 59/10; F16H 61/22; F16H 63/48; B60W 10/11; B60W 10/182
USPC ..................................... 701/48, 51
See application file for complete search history.

(56) References Cited

U.S. PATENT DOCUMENTS

| 7,178,619 | B2 | 2/2007 | Oono | |
|---|---|---|---|---|
| 7,934,590 | B2 * | 5/2011 | Duhaime et al. | 192/219.5 |
| 8,103,396 | B2 | 1/2012 | Mitsutani | |
| 8,457,824 | B2 * | 6/2013 | Sopko et al. | 701/22 |
| 2002/0084149 | A1 * | 7/2002 | Heuver | 188/69 |
| 2004/0200683 | A1 | 10/2004 | Amamiya et al. | |

FOREIGN PATENT DOCUMENTS

JP        2002349702  A    12/2002

OTHER PUBLICATIONS

International Search Report and Written Opinion dated Jun. 3, 2015 for International Application No. PCT/US2014/046834, International Filing Date Jul. 16, 2014.

* cited by examiner

*Primary Examiner* — Calvin Cheung
*Assistant Examiner* — Paula L Schneider
(74) *Attorney, Agent, or Firm* — Ralph E. Smith (57) ABSTRACT

A technique includes receiving, at a controller of a vehicle, the controller including one or more processors, a first request to calibrate a park lock system of the vehicle. The calibration can include commanding, by the controller, a first actuator to move a second actuator to maximum engagement/disengagement positions indicating maximum engagement/disengagement of a park pawl with/from a park gear of a transmission. The calibration can include determining, at the controller, full engagement/disengagement positions for the second actuator based on the maximum engagement/disengagement positions. The controller can then control the engagement/disengagement of the park lock system using the full engagement/disengagement positions for the second actuator, respectively.

20 Claims, 5 Drawing Sheets

TECHNIQUES FOR ROBUST PARK LOCK CONTROL

FIELD

The present disclosure relates generally to electronically controlled vehicle park lock systems and, more particularly, to techniques for robust park lock control for electronically controlled vehicle park lock systems.

BACKGROUND

A vehicle can be propelled by a drive torque that is generated by an internal combustion engine, an electric motor, etc. and then transferred to a driveline of the vehicle by a transmission. The transmission can be either a manual transmission or an automatic transmission (a conventional automatic transmission, a semi-automatic transmission, a continuously variable transmission, etc.). An automatic transmission may be referred to as a "shift-by-wire" transmission when at least some of the mechanical components are replaced by electrical components. Vehicles equipped with automatic transmissions may also include a park lock system that is configured to selectively engage a park gear of the transmission to prevent the vehicle from moving. Similarly, a park lock system that includes at least some electrical components in place of mechanical components can be referred to as a "park-by-wire" system.

SUMMARY

In one form, a method for controlling a vehicle park lock system is provided in accordance with the teachings of the present disclosure. The method can include receiving, at a controller of a vehicle, the controller including one or more processors, a first request to calibrate the park lock system of the vehicle. The method can include commanding, by the controller, a first actuator to move a second actuator to maximum engagement and maximum disengagement positions in response to receiving the first request, the second actuator being configured to engage/disengage a park pawl of the park lock system with/from a park gear of a transmission of the vehicle, the maximum engagement position indicating a maximum engagement of the park pawl with the park gear, the maximum disengagement position indicating a maximum disengagement of the park pawl from the park gear. The method can include determining, at the controller, full engagement and full disengagement positions for the second actuator based on the maximum engagement and maximum disengagement positions, the full engagement position indicating full engagement but less than the maximum engagement of the park pawl with the park gear, the full disengagement position indicating full disengagement but less than maximum disengagement of the park pawl from the park gear. The method can also include controlling, by the controller, the first actuator to move the second actuator to engage/disengage the park pawl with/from the park gear using the full engagement and full disengagement positions, respectively.

In another form, a method for controlling a vehicle park lock system is provided in accordance with the teachings of the present disclosure. The method can include receiving, at a controller for the park lock system for a transmission of the vehicle, the controller including one or more processors, a first request to calibrate the park lock system. The method can include commanding, by the controller, an electric motor to move an actuator from an initial position to a maximum engagement position in response to receiving the first request, the electric motor being configured to move the actuator, the actuator being configured to engage/disengage a park pawl of the park lock system with a park gear of a transmission of the vehicle, the maximum engagement position indicating a maximum engagement of the park pawl with the park gear. The method can include determining, at the controller, a full engagement position for the actuator based on the maximum engagement position, the full engagement position indicating full engagement of the park pawl with the park gear but less than the maximum engagement of the park pawl with the park gear. The method can include commanding, by the controller, the electric motor to move the actuator from the maximum engagement position to the full engagement position. The method can include receiving, at the controller, a second request to transition the transmission from the park gear to a non-park gear. The method can include commanding, by the controller, the electric motor to move the actuator from the full engagement position to a maximum disengagement position in response to receiving the second request, the maximum disengagement position indicating a maximum disengagement of the park pawl from the park gear. The method can include determining, at the controller, a full disengagement position for the actuator based on the maximum disengagement position, the full disengagement position indicating full disengagement of the park pawl from the park gear but less than the maximum disengagement of the park pawl from the park gear. The method can also include controlling, at the controller, the electric motor to move the actuator to engage/disengage the park pawl with/from the park gear using the full engagement position and the full disengagement position, respectively.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, vehicles equipped with automatic transmissions may also include a park lock system that is configured to selectively engage a park gear of the transmission to prevent the vehicle from moving. The park lock system can include one or more actuators configured to engage/disengage a park pawl from the park gear of the transmission. For example, a first actuator can move a second actuator, which can engage/disengage the park pawl with/from the park gear of the transmission. In order to engage/disengage the park pawl from the park gear of the transmission, accurate positions of the first and second actuators may be required.

When the vehicle is turned off, however, the positions of the first and second actuators can change. For example only, the first and/or second actuators can be adjusted or replaced during vehicle maintenance. The positions of the first and second actuators can also gradually change over time. An additional position sensor can be implemented that is configured to monitor a maximum position of the second actuator, which can correspond to a maximum engagement of the park pawl with the park gear of the transmission. This additional position sensor, however, can increase costs and/or can increase system complexity due to additional fault detection for the position sensor.

Accordingly, techniques are presented for robust park lock control with fewer sensor measurements. These techniques can be more robust than other techniques, such as an in-plant calibration, which cannot account for future events such as a part change or hardware servicing. In addition, the techniques can eliminate the need for an additional position sensor by performing a fast calibration process after each vehicle key-on event and, in some cases, periodically during vehicle operation, which can decrease costs. For example, the calibration process can occur in a few seconds either (i) before, during, or after the engine of the vehicle has been started, or (ii) in response to the driver engaging the park lock system, which provides sufficient time for the calibration process to complete before the driver would likely attempt to unlock the park lock system. Additionally, the techniques can also store a final position of an actuator for the park lock system in memory for future reference, which can decrease detected errors and thereby further increase the robustness of the park lock system.

The techniques can include receiving, at a controller of a vehicle, the controller including one or more processors, a first request to calibrate a park lock system of the vehicle. The calibration procedure can include commanding, by the controller, a first actuator to move a second actuator to maximum engagement and disengagement positions indicative of maximum engagement/disengagement of a park pawl with/from a park gear of a transmission, respectively. The calibration can include determining, at the controller, full engagement and disengagement positions for the second actuator based on the maximum engagement and maximum disengagement positions.

The full engagement position can be a position between a minimum engagement position and the maximum engagement position, where the minimum engagement position corresponds to a minimum position for the park pawl to engage with the park gear. Similarly, the full disengagement position can be a position between a minimum disengagement position and the maximum disengagement position, where the minimum disengagement position corresponds to a minimum position for the park pawl to disengage from the park gear. The controller can then control the engagement/disengagement of the park lock system using the full engagement/disengagement positions for the second actuator, respectively.

Figure 1:
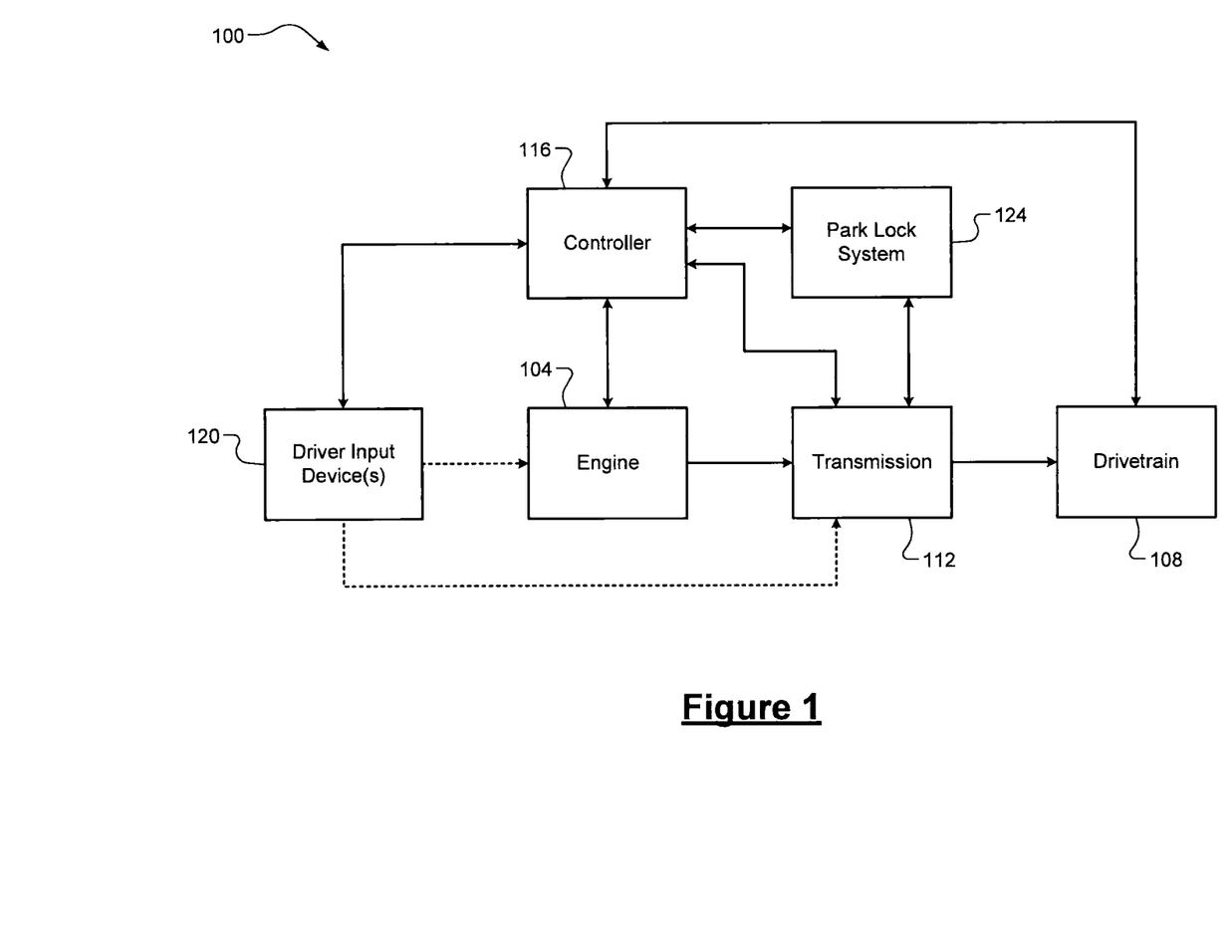
FIG. 1 is a functional block diagram of a vehicle including a controller and a park lock system according to the principles of the present disclosure.

Referring now to FIG. 1, a functional block diagram of a vehicle 100 is illustrated. The vehicle 100 can include an engine 104 (an internal combustion engine, and/or an electric motor, etc.) that can generate drive torque. In some implementations, the vehicle 100 may be a battery electric vehicle (BEV) and the engine 104 may be replaced with an electric motor that is powered by a battery pack (not shown). The drive torque generated by the engine 104 can be transferred to a drivetrain 108, e.g., four wheels, of the vehicle 104 by a transmission 112. For example, the transmission 112 may be an automatic "shift-by-wire" transmission. It should be appreciated, however, that other suitable transmissions can be implemented. In the case of a BEV, the transmission 112 may include a single drive gear, e.g., continuously variable, a neutral gear, and a park gear.

A controller 116 can control operation of the vehicle 100. In particular, the controller 116 can control the engine 104 to adjust the drive torque output to the drivetrain 108. Specifically, the controller 116 can control the engine 104 based on driver input via one or more driver input devices 120, e.g., an accelerator pedal. The controller 116 may also control the transmission 112 based on driver input via the driver input devices 120, e.g., a shift lever. It should be appreciated, however, that the driver input devices 120 may also be configured to manually control the engine 104 and/or the transmission 112 without intervention by the controller 116

The vehicle 100 can also include a park lock system 124. The park lock system 124 can selectively engage a park gear 216 (see FIG. 2) of the transmission 112 to prevent the drivetrain 108 of the vehicle 100 from moving. The park lock system 124 can be controlled by the controller 116. For example, the controller 116 can command the park lock system 124 to engage the park gear of the transmission 112 when the vehicle 100 is turned off or when the driver input indicates a manual selection of the park gear via the driver input devices 120. The controller 116 can also implement the techniques of the present disclosure, which are described in more detail below.

Figure 2:
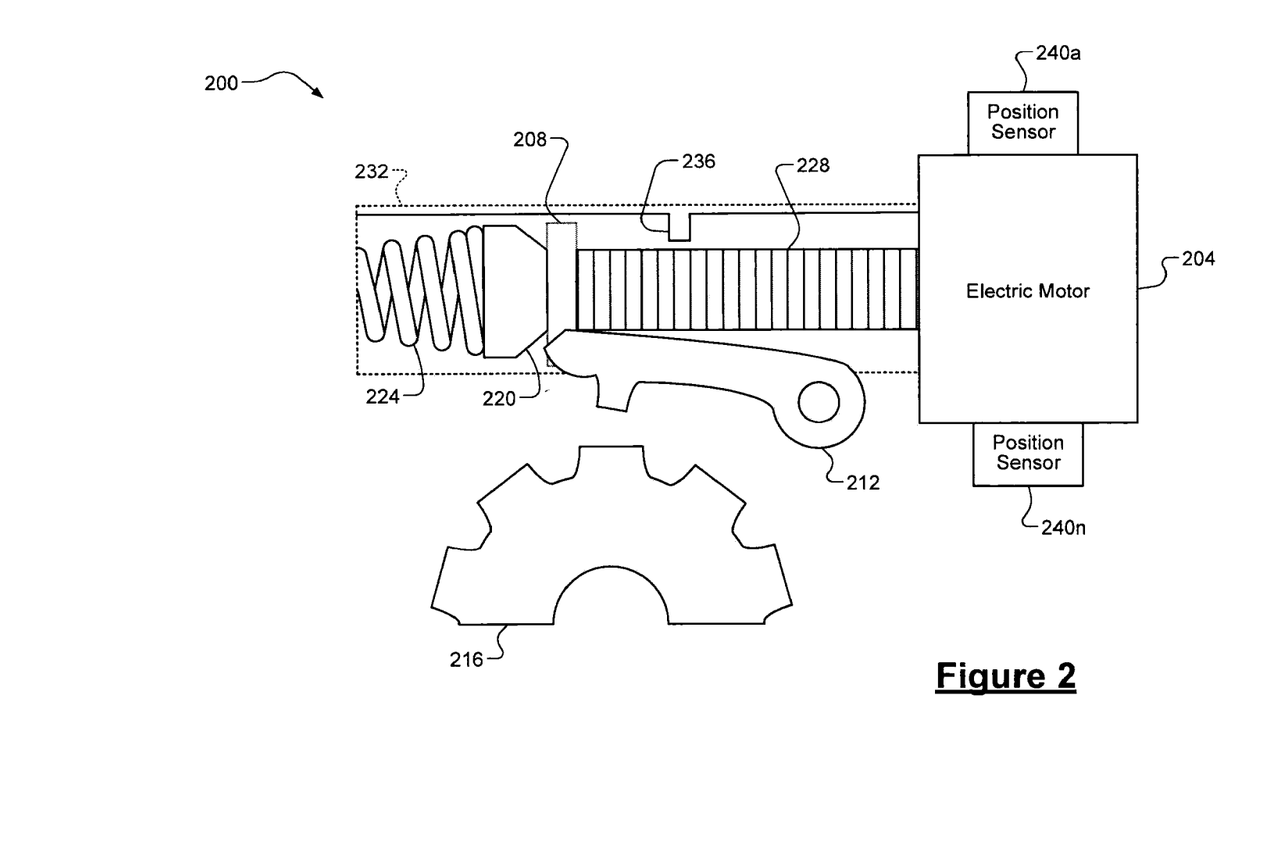
FIG. 2 is a diagram of an example of the park lock system according to the principles of the present disclosure.

Referring now to FIG. 2, a diagram of an example park lock system 200 is illustrated. The example park lock system 200 can include an electric motor 204, a screw nut 208, and a park pawl 212. In some implementations, the park lock system 124 may be configured according to the example park lock system 200. It should be appreciated, however, that the park lock system 124 can have other suitable configurations, such as other suitable first and/or second actuators, e.g., solenoids, which are discussed in detail below and illustrated in FIG. 3. While not shown, the controller 116 can command the electric motor 204 and receive measurements with respect to the electric motor 204.

A push element 220 can be configured to physically displace the park pawl 212 to engage/disengage a park gear 216 of the transmission 112. For example, the push element 220 can be spring-loaded by a spring 224. The screw nut 208 can be configured to laterally displace the push element 220 to disengage the push element 220 from the park pawl 212 and thereby disengage the park pawl 212 from the park gear 216 of the transmission 112. The electric motor 204 can be configured to push the screw nut 208 against the push element 220, which causes the park pawl 212 to retract and disengage the park gear 216, thereby unlocking the transmission 112. The electric motor 204 can also be configured to pull the screw nut 208 back, which causes the push element 220 to move against the park pawl 212 and push the park pawl 212 down, thereby engaging the park pawl 212 with the park gear 216 to lock the transmission 112.

The screw nut 208 can be internally threaded such that it can rotate about a spindle 228 that is externally threaded. In one implementation, the screw nut 208 can be rotationally fixed, the spindle 228 can be laterally fixed, and the electric motor 204 can be configured to rotate the spindle 228, which causes the screw nut 208 to move laterally with respect to the electric motor 204. For example, the screw nut 208 can be keyed and can move laterally along a track. In another implementation, the screw nut 208 can be fixed with respect to the spindle 228, and the electric motor 204 can be configured to rotate the spindle 228, which causes both the spindle 228 and the screw nut 208 to move laterally with respect to the electric motor 204. It should be appreciated, however, that other suitable configurations can be implemented. A park cartridge 232 can house the screw nut 208, the push element 220, the spring 224, and the spindle 228. The park cartridge 232 can include an end stop 236 configured to stop the push element 220 and/or screw nut 208 from any further lateral movement in a particular direction.

The example park lock system 200 can also include one or more position sensors 240a . . . 240n (n≥1, hereinafter position sensors 240) configured to measure a rotational position of the electric motor 204. In some implementations, two position sensors 240 can be implemented (as shown) such that a first position sensor 240a can measure a first rotational position of the electric motor 204 at a first position, e.g., a first pole or zero degrees, and a second position sensor 240n can measure a second rotational position of the electric motor 204 at a second position, e.g., a second pole or 90 degrees. Such implementation allows for the measurement of direction and displacement of the electric motor 204 as is known in the art.

Figure 3:
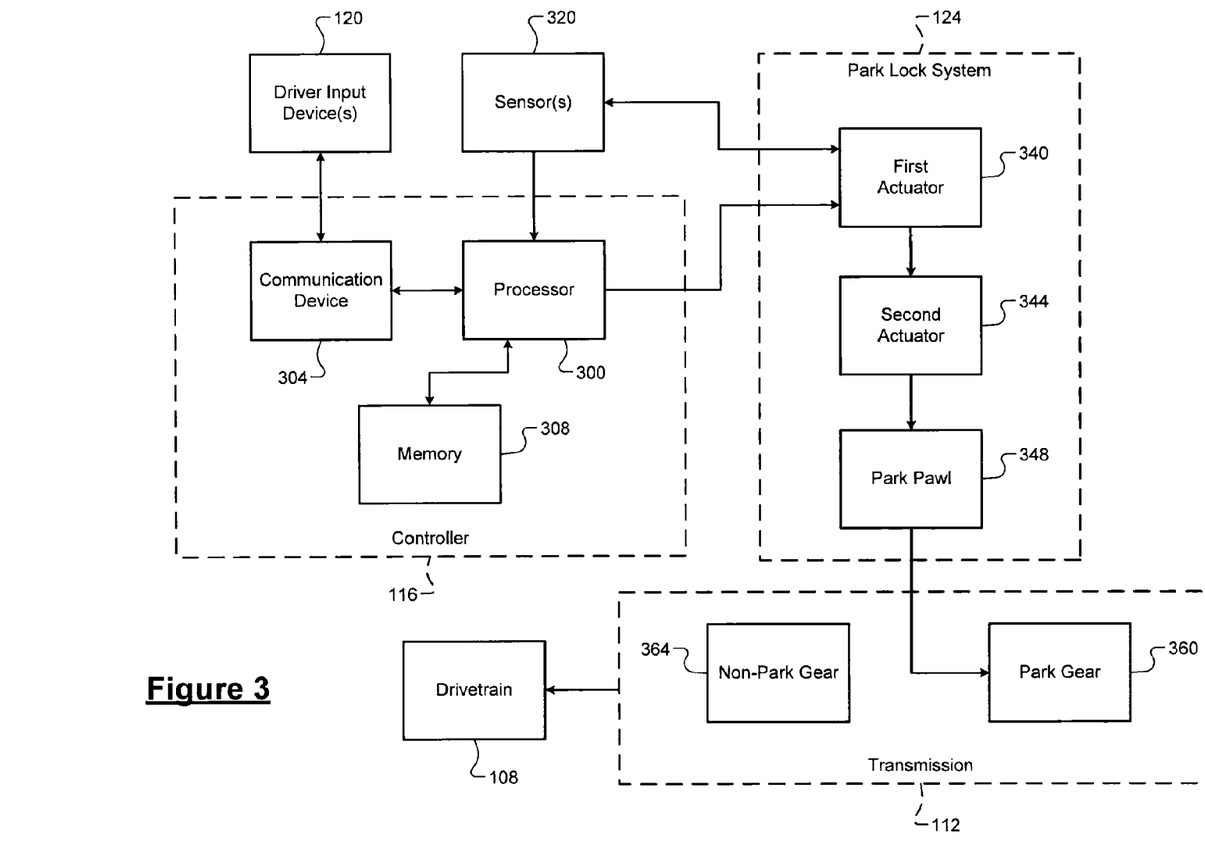
FIG. 3 is a functional block diagram of the controller, the park lock system, and a transmission of the vehicle according to the principles of the present disclosure.

Referring now to FIG. 3, functional block diagrams of the transmission 112, the controller 116, and the park lock system 124 are illustrated. The controller 116 can include a processor 300, a communication device 304, and a memory 308. It should be appreciated that the term "processor" as used herein can refer to both a single processor and two or more processors operating in a parallel or distributed architecture.

The park lock system 124 can include a first actuator 340, a second actuator 344, and a park pawl 348. It should be appreciated that the term "first actuator" as used herein can refer any suitable actuator, e.g., a solenoid, configured to move the second actuator 344 in order to engage/disengage the park pawl 348 with/from a park gear 360 of the transmission 112. Similarly, it should be appreciated that the term "second actuator" as used herein can refer to any suitable actuator, e.g., a lever, configured to be moved by the first actuator 340 and displace the park pawl 348 to engage/disengage the park pawl 348 with/from the park gear 360 of the transmission 112. The transmission 112 can also include a non-park gear 364 (a neutral gear, a drive gear, a reverse gear, etc.).

It should also be appreciated that the term "park pawl" as used herein can refer to both the park pawl 348 and other suitable actuators configured to engage/disengage with/from the park gear 360 of the transmission 112. As previously mentioned, it should be appreciated that the park lock system 124 can be configured according to the example park lock system 200 of FIG. 2. Specifically, the first actuator 340 can be the electric motor 204, the second actuator 344 can be the push element 220 (or some combination of the push element 220 with the screw nut 208, the spring 224, and/or the spindle 228), the park pawl 348 can be the park pawl 212, and the park gear 360 can be the park gear 216.

The processor 300 can control operation of the controller 116. The processor 300 can perform functions including, but not limited to launching/executing an operating system of the controller 116, controlling communication with other vehicle components, e.g., the driver input devices 120, via the communication device 304, controlling read/write operations at the memory 308, and processing measurements and/or other information from the sensors 320. The communication device 304 can include any suitable components configured for communication with the other vehicle components, e.g., the driver input devices 120, via a controller area network (CAN) or another suitable network. The memory 308 can be any suitable storage medium (flash, hard disk, etc.). In some implementations, the memory 308 can be a non-volatile memory (NVM), such as an electronically-erasable programmable read-only memory (EEPROM).

The sensors 320 can be configured to measure one or more parameters of the first actuator 340. For example, the sensors 320 can include a current sensor configured to measure a current drawn by the first actuator 340. Additionally or alternatively, the sensors 320 can include one or more position sensors, e.g., position sensors 232, configured to measure one or more positions of the first actuator 340. For example, in the case of the first actuator 340 being the electric motor 204, the sensors 320 could include a quadrature sensor configured to measure direction and displacement of the electric motor 204 as is known in the art. It should be appreciated, however, that the sensors 320 could alternatively or additionally include other sensors configured to measure other suitable parameters for the first actuator 340.

According to the techniques of the present disclosure, the processor 304 can receive a first request to calibrate the park lock system 124. The first request can be a key-on event of the vehicle 100, which can be received by the communication device 304 from the driver input devices 120, e.g., an ignition. The term "key-on event" as used herein can refer to when a driver of the vehicle 100 inserts a key into the ignition of the vehicle 100 or when the driver pushes a start button of the vehicle 100. The key-on event, however, does not require that the engine 104 of the vehicle 100 has actually been started, e.g., ignition of an internal combustion engine. In other words, the key-on event can refer to an accessory mode where battery power is provided to select devices of the vehicle 100, e.g., the park lock system 124.

Alternatively, the first request to calibrate the park lock system 124 can be automatically generated by the processor 300 during operation of the vehicle 100. More specifically, the first request can be generated by the processor 300 after every $N^{th}$ transition (N>1) from the non-park gear 364 to the park gear 360 or from the park gear 360 to the non-park gear 364, subsequent to the key-on event of the vehicle 100, i.e., during operation of the vehicle 100. In some implementations, the value of N may correspond to a specific number of non-park to park or park to non-park transitions of the transmission 112 having a high degree of likelihood that the park lock system 124 could be out of calibration. For example only, N may equal 10. In response to receiving the first request to calibrate the park lock system 124, the processor 300 can command the first actuator 340 to move the second actuator 344 to various positions to perform the calibration procedure.

Further, this calibration procedure could be performed in an assembly plant for the vehicle 100, during service of the vehicle 100, and/or after an abnormal shutdown of the controller 116, which is different than a key-on event that follows a "normal" shutdown of the controller 116.

Figure 4:
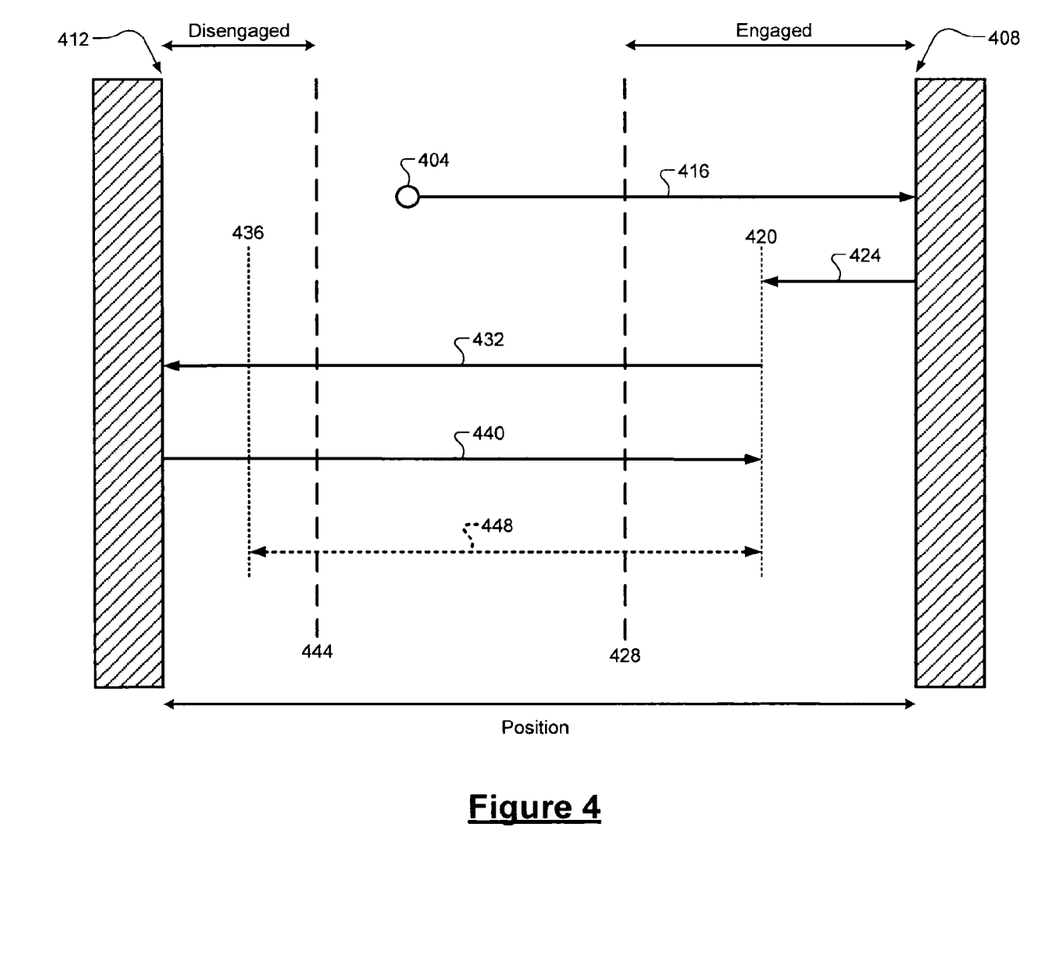
FIG. 4 is a diagram of first, second, third, and fourth positions of a second actuator of the park lock system according to the principles of the present disclosure.

Referring now to FIG. 4 with continued reference to FIG. 3, an exemplary illustration of these various positions of the second actuator 344 of the park lock system 124 is shown. It should be appreciated that while the various positions are described as being positions of the second actuator 344, e.g., the push element 220, these various positions can also represent positions of the screw nut 208, which in turn moves the push element 220. In response to receiving the first request to calibrate the park lock system 124, the second actuator 344 may be at an unknown position, e.g., after a key-on event of the vehicle 100. This can be referred to as an initial position 404.

From the initial position 404, the processor 300 can command the first actuator 340 to move the second actuator 344 to a maximum engagement position 408. The maximum engagement position 408 can indicate a maximum position of the second actuator 344, which can correspond to a maximum engagement of the park pawl 348 with the park gear 360 of the transmission 112. Similarly, a maximum disengagement position 412 can indicate a minimum position of the second actuator 344, which can correspond to a maximum disengagement of the park pawl 348 from the park gear 360 of the transmission 112.

The movement from the initial position 404 to the maximum engagement position 408 can be referred to as a first command 416. Because the precise location of the initial position 404 may be unknown, the processor 300 can determine the maximum engagement position 408 as follows. The processor 304 can command the first actuator 340 to move the second actuator 344 at a predetermined velocity (a predetermined velocity profile) in a direction towards maximum engagement of the park pawl 348 with the park gear 360 of the transmission 112. The predetermined velocity can be a velocity that is slow enough to prevent damage to the park lock system 124, e.g., by the first actuator 340 moving or trying to move the second actuator 344 further than the maximum engagement position 408. The processor 300 can then monitor one or more parameters of the first actuator 340, e.g., via sensors 320, while the second actuator 344 is moving at the predetermined velocity.

For example, the processor 300 can monitor a current drawn by the first actuator 340. When the current exceeds a predetermined current, the processor 300 can determine that the second actuator 344 has reached the maximum engagement position 408. The predetermined current can indicate a reasonable current that the first actuator 340 should be drawing in order to move the second actuator 344 at the predetermined velocity. In other words, when the current drawn by the first actuator 340 exceeds the predetermined current, the first actuator 340 is trying too hard to move the second actuator 344, and thus the processor 300 can determine that the second actuator 344 has reached the maximum engagement position 408.

Alternatively, for example, the processor 300 can monitor one or more positions or speeds of the first actuator 340. In the case of the electric motor 204, the processor 300 can monitor a number of revolutions of the electric motor 204 (also referred to as "counts") and/or a rotational speed of the electric motor 204. These counts can then be used as a measure of the position of the second actuator 344. When the counts or the rotational speed is less than predetermined amount, e.g., for a predetermined period of time, the processor 300 can determine that the second actuator 344 hasn't reached the maximum engagement position 408 because its lateral displacement is being inhibited.

After determining that the second actuator 344 has reached the maximum engagement position 408, the processor 300 can command the first actuator 340 to move the second actuator 344 to a full engagement position 420. The movement from the maximum engagement position 408 to the full engagement position 420 can be referred to as a second command 424. The full engagement position 420 can indicate full engagement of the park pawl 348 with the park gear 360, but less than the maximum engagement of the park pawl 348 with the park gear 360 at the first position 408. In other words, this full engagement position 420 can be located between a minimum engagement position 428 of the second actuator 344 for full engagement of the park pawl 348 with the park gear 360 and the maximum engagement position 408.

The minimum engagement position 428 can represent a minimum position of the second actuator 344 to engage the park pawl 348 with the park gear 360. The full engagement position 420 can refer to any position between the minimum engagement position 428 and the maximum engagement position 408, inclusive, and thus the term "full engagement" can also refer to a partial engagement of the park pawl 348 with the park gear 360 that still prevents the vehicle 100 from moving. For example, the full engagement position 420 may be a predetermined offset from the maximum engagement position 408. The full engagement position 420 can be a desirable "engagement" position for the park lock system 124 because disengagement of the park lock system 124 can be commanded faster than if the second actuator 344 were positioned at the maximum engagement position 408.

After the second actuator 344 reaches the full engagement position 420, the processor 300 can wait until a second request to transition from the park gear 360 to the non-park gear 364 of the transmission 112 occurs. For example, this second request may be in response to driver input via the driver input devices 120. In response to receiving the second request, the processor 300 can command the first actuator 340 to move the second actuator 344 to the maximum disengagement position 412. As previously described, the maximum disengagement position 412 can indicate a minimum position of the second actuator 344, which can correspond to a maximum disengagement of the park pawl 348 from the park gear 360 of the transmission 112. The processor 300 can determine that the second actuator 344 has reached the maximum disengagement position 412 by monitoring the parameter(s) of the first actuator 340 according to the same or similar techniques as described with respect to determining the maximum engagement position 408. The movement of the second actuator 344 from the full engagement position 420 to the maximum disengagement position 412 can be referred to as a third command 432.

After determining that the second actuator 344 has reached the maximum disengagement position 412, the processor 300 can determine the distance traveled, e.g., a number of counts, to the maximum disengagement position 412, and can compare the distance traveled to a predetermined tolerance. When the distance traveled is not within the predetermined tolerance, the processor 300 can generate and output a fault. After the second actuator 344 reaches the maximum disengagement position 412, the processor 300 can wait for a future request to transition from the non-park gear 364 to the park gear 360. As previously discussed, this future request may be in response to driver input via the driver input devices 120.

In response to receiving this future request, the processor 300 can command the first actuator 340 to move the second actuator 344 to the full engagement position 420. The movement of the second actuator 344 from the maximum disengagement position 412 to the full engagement position 420 can be referred to as a fourth command 440. Further, in response to other future requests to transition from the park gear 360 to the non-park gear 364, the processor 300 could command the first actuator 340 to move the second actuator 344 from the full engagement position 420 to a full disengagement position 436. In this manner, the park lock system 124 is now calibrated for operation by moving the second actuator 344 between the full engagement and disengagement positions 420 and 436, respectively, as indicated at 448.

The full disengagement position 436 can indicate full disengagement of the park pawl 348 from the park gear 360, but less than the maximum disengagement of the park pawl 348 from the park gear 360 at the second position 412. In other words, this full disengagement position 436 can be located between a minimum disengagement position 444 of the second actuator 344 for full disengagement of the park pawl 348 with the park gear 360 and the maximum disengagement position 412. The minimum disengagement position 444 can represent a minimum position of the second actuator 344 to disengage the park pawl 348 from the park gear 360. The full disengagement position 436 can refer to any position between the maximum disengagement position 412 and the minimum disengagement position 444, inclusive, and thus the term "full disengagement" can also refer to a partial disengagement of the park pawl 348 with the park gear 360, but one that does not prevent the vehicle 100 from moving. For example, the full disengagement position 436 may be a predetermined offset from the maximum disengagement position 412. The full disengagement position 436 can be a desirable "disengagement" position for the park lock system 124 because engagement of the park lock system 124 can be commanded faster than if the second actuator 344 were positioned at the maximum disengagement position 412.

The techniques can also be described as being divided into four phases: an initialization phase, an engage park lock phase, a zero-reference-learn phase, and a disengage park lock phase. Further, auto engagement can occur under such conditions as keying-off in a disengaged position, plugging in in a disengaged position, and driver door open. The initialization and zero-reference-learn phases can refer to "fingerprinting" the hardware or learning the end-to-end maximum travel of the second actuator 344. The initialization phase is automatically initiated by the controller 116 after each power-up from a normal or an abnormal controller shutdown. In these cases, and with continued reference to FIG. 4, the initialization phase can include moving the second actuator 344 to the maximum engagement position 408 and then to a calibratable lock position, such as the full engagement position 420.

The zero-reference-learn phase can be performed at a first transition from the park gear 360 to the non-park gear 364 subsequent to a key-on event and after every $N^{th}$ transition from the park gear 360 to the non-park gear 364. The zero-reference-learn phase can refer to moving the second actuator 344 from a known starting position, such as the full engagement position 420 discussed immediately above, all the way to a hard mechanical stop at a disengage side to establish a datum and a reference point for the position of the second actuator 344. The measurements/readings of the sensor(s) 320 could then be set to zero. With reference to FIG. 4, the zero-reference-learn phase can include moving the second actuator 344 to the maximum disengagement position 412.

The engage park lock phase and the disengage park lock phase can refer to moving the second actuator 344 to full engagement and full disengagement of the park pawl 348 with the park gear 360, respectively. With reference to FIG. 4, the engage park lock phase can include moving the second actuator 344 to the full engagement position 420, or to some other position between the minimum engagement position 428 and the maximum engagement position 408, inclusive. For example, the second actuator 344 may be moved to the full engagement position 420 or the other suitable position from the maximum disengagement position 412. With continued reference to FIG. 4, the disengage park lock phase can include moving the second actuator 344 to the full disengagement position 436, or to some other position between the minimum disengagement position 444 and the maximum disengagement position 412, inclusive. For example, the second actuator 344 can be moved to the full disengagement position 436 or the other suitable position from the full engagement position 420 or another suitable position for engagement of the park pawl 348 with the park gear 360.

Lastly, the auto engagement may occur in response to a key-off event of the vehicle 100, depending on whether the transmission 112 is in the non-park gear 364 or in the park gear 360 and, in some cases, based on other parameters. A key-off event refers to turning the ignition key off. When a key-off event occurs when the transmission is in the park gear 360, no action is taken by the controller 116. When a key-off event occurs when the transmission 112 is in the non-park gear 364, however, various actions can be taken by the controller 116 because the park gear 360 is not engaged. When the key-off event occurs when the transmission 112 is in the non-park gear 364 and vehicle speed is less than or equal to a predetermined speed threshold, the controller 116 can automatically command the second actuator 344 to the full engagement position 420 (or other suitable full engagement position) to engage the park pawl 348 with the park gear 360. The predetermined speed threshold can be indicative of an acceptable vehicle speed, e.g., zero miles per hour, for shifting the transmission 112 into the park gear 360.

When the key-off event occurs when the transmission is in the non-park gear 364 but the vehicle speed is greater than the predetermined speed threshold, the controller 116 can automatically shift the transmission 112 to neutral until the vehicle speed falls to less than or equal to the predetermined speed threshold, after which the controller 116 can automatically command the second actuator 344 to the full engagement position 420 (or other suitable full engagement position) to engage the park pawl 348 with the park gear 360.

The discussion will now turn to a key-on event of the vehicle 100. In response to any key-on event and when power to the controller 116 has not been lost and the controller 116 has not otherwise experienced an abnormal shutdown, the controller 116 can execute the following procedure. First, the controller 116 can read a final position from the memory 308, e.g., NVM, indicative of the final position of the second actuator 344. The controller 116 can determine whether this final position is between the maximum engagement position 408 and the minimum engagement position 428, which represents full engagement of the park pawl 348 with the park gear 360. If true, the controller 116 can set the initial position 404 to the retrieved final position.

The controller 116 can then issue a command, e.g., the first command 416, to move the second actuator 344 to the maximum engagement position 408. At the maximum engagement position 408, the controller 116 can compare the distance traveled by the second actuator 344, e.g., a number of counts, to a stored count from the memory 308, e.g., EEPROM. If the number of counts at the maximum engagement position 408 and the stored count are within a tolerance, the controller 116 can then issue a command, e.g., the second command 424, to move the second actuator 344 to the full engagement position 420. If the number of counts at the maximum engagement position 408 and the stored count are not within the tolerance, however, the number of counts are set to a predefined known value, and the controller 116 then issues a command, e.g., the second command 424, to move the second actuator 344 to the full engagement position 420.

If the controller 116 determines that the final position is not between the maximum engagement position 408 and the minimum engagement position 428, which represents full engagement of the park pawl 348 with the park gear 360, the controller can set the initial position 404 to zero. Next, the controller 116 can issue a command to move the second actuator 344 to the maximum engagement position 408. At the maximum engagement position 408, the count is set to the predefined known value. The controller 116 can then issue a command, e.g., the second command 424, to move the second actuator 344 to the full engagement position 420. Furthermore, when the first actuator 340 is replaced, the controller 116 can perform the steps discussed above and herein to re-learn the distance between the maximum engagement position 408 and the maximum disengagement position 412.

Figure 5:
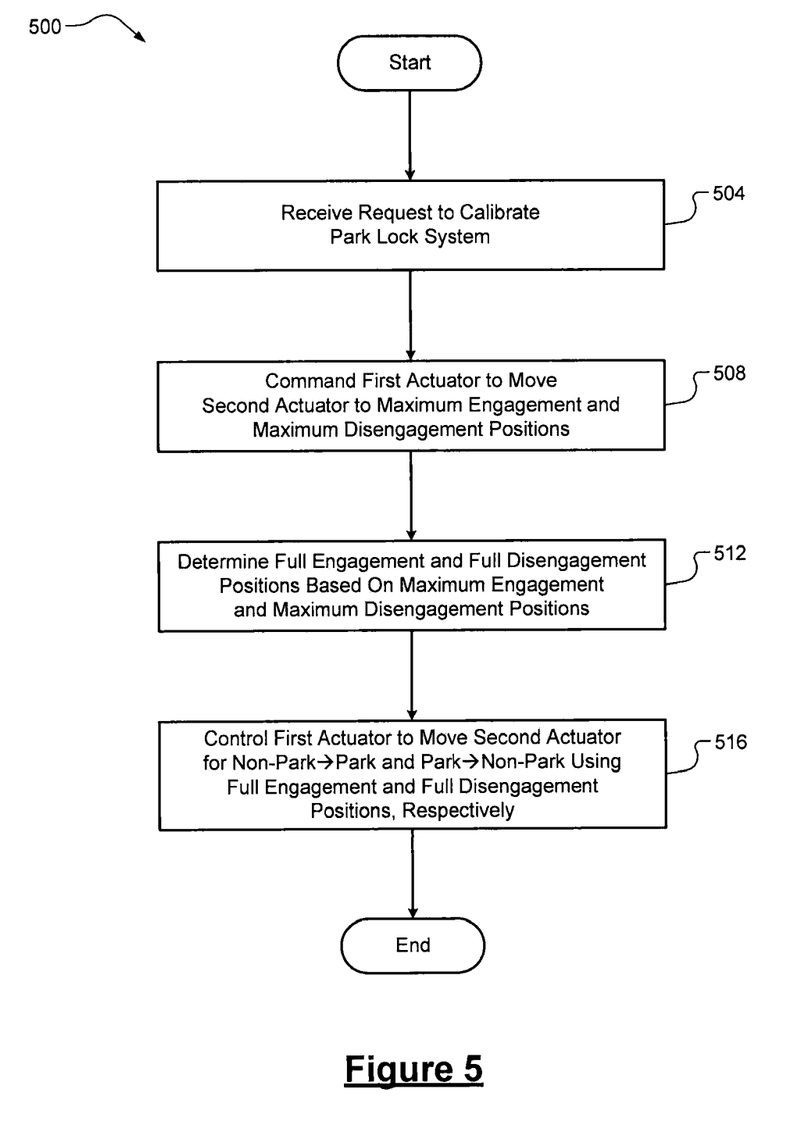
FIG. 5 is a flow diagram of a technique for robust park lock control with fewer sensor measurements according to the principles of the present disclosure.

Referring now to FIG. 5, a flow diagram of an exemplary technique 500 for robust park lock control with fewer sensor measurements is illustrated. At 504, the controller 116 automatically, based on information at the memory 308, e.g., NVM, calibrates the park lock system 124 of the vehicle 100. At 508, the controller 116 can, in one exemplary implementation, command the first actuator 340 to move the second actuator 344 to the maximum engagement and maximum disengagement positions 408 and 412, respectively, in response to receiving the first request. In some implementations, the controller 116 may command the first actuator 340 to move the second actuator 344 to the maximum engagement position 408, and then to the full engagement position 420, in response to receiving the first request. The second actuator 344 can be configured to engage/disengage the park pawl 348 of the park lock system 124 with/from the park gear 360 of the transmission 112 of the vehicle 100. The maximum engagement position 408 can indicate a maximum engagement of the park pawl 348 with the park gear 360 and the maximum disengagement position 412 can indicate a maximum disengagement of the park pawl 348 from the park gear 360.

At 512, the controller 116 can determine the full engagement and full disengagement positions 420 and 436, respectively, for the second actuator 344 based on the maximum engagement and maximum disengagement positions 408 and 412, respectively, as discussed herein. The full engagement position 420 can indicate full engagement but less than the maximum engagement of the park pawl 348 with the park gear 360. The full disengagement position 436 can indicate full disengagement but less than maximum disengagement of the park pawl 348 from the park gear 360. At 516, the controller 116 can control the first actuator 340 to move the second actuator 344 to engage/disengage the park pawl 348 with/from the park gear 360 using the full engagement/disengagement positions 420 and 436, respectively. For example, the park pawl 348 can be engaged with/disengaged from the park gear 360 in response to transitions between the park gear 360 and the non-park gear 364. The technique 500 can then end or return to 504 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method for controlling a vehicle park lock system, comprising:
   receiving, at a controller of the vehicle, the controller including one or more processors, a first request to calibrate the park lock system of the vehicle;
   commanding, by the controller, a first actuator to move a second actuator to maximum engagement and maximum disengagement positions in response to receiving the first request, the second actuator being configured to engage/disengage a park pawl of the park lock system with/from a park gear of a transmission of the vehicle, the maximum engagement position indicating a maximum engagement of the park pawl with the park gear, the maximum disengagement position indicating a maximum disengagement of the park pawl from the park gear;
   determining, at the controller, full engagement and full disengagement positions for the second actuator based on the maximum engagement and maximum disengagement positions, the full engagement position indicating full engagement but less than the maximum engagement of the park pawl with the park gear, the full disengagement position indicating full disengagement but less than maximum disengagement of the park pawl from the park gear; and
   controlling, by the controller, the first actuator to move the second actuator to engage/disengage the park pawl with/from the park gear using the full engagement and full disengagement positions, respectively.

2. The method of claim 1, wherein the first request indicates a key-on event of the vehicle.

3. The method of claim 2, wherein the first request indicates an $N^{th}$ transition from a non-park gear of the transmission to the park gear or from the park gear to the non-park gear, subsequent to the key-on event of the vehicle, wherein N is an integer greater than one.

4. The method of claim 1, wherein commanding the first actuator to move the second actuator to the maximum engagement and maximum disengagement positions in response to receiving the first request further includes:
   commanding, by the controller, the first actuator to move the second actuator from an initial position to the maximum engagement position in response to receiving the first request;
   commanding, by the controller, the first actuator to move the second actuator from the maximum engagement position to the full engagement position;
   receiving, at the controller, a second request to transition the transmission from the park gear to a non-park gear of the transmission; and
   commanding, by the controller, the first actuator to move the second actuator from the full engagement position to the maximum disengagement position in response to receiving the second request.

5. The method of claim 4, wherein commanding the first actuator to move the second actuator from the initial position to the maximum engagement position includes:
- commanding, by the controller, the first actuator to move the second actuator at a predetermined velocity from the initial position in a first direction corresponding to engagement of the park pawl with the park gear;
- monitoring, at the controller, at least one of a current drawn by the first actuator and a parameter of the first actuator that is indicative of the movement of the second actuator; and
- commanding, by the controller, the first actuator to stop moving the second actuator based on the monitoring to obtain the maximum engagement position.

6. The method of claim 5, wherein commanding the first actuator to move the second actuator from the full engagement position to the maximum disengagement position includes:
- commanding, by the controller, the first actuator to move the second actuator at the predetermined velocity from the full engagement position in a second direction corresponding to disengagement of the park pawl from the park gear;
- monitoring, at the controller, at least one of the current drawn by the first actuator and the parameter of the first actuator that is indicative of the movement of the second actuator; and
- commanding, by the controller, the first actuator to stop moving the second actuator based on the monitoring to obtain the maximum disengagement position.

7. The method of claim 6, wherein commanding the first actuator to stop moving the second actuator to obtain the maximum engagement and maximum disengagement positions is performed when at least one of (i) the current drawn by the first actuator exceeds a predetermined current and (ii) the parameter for the first actuator that is indicative of the movement of the second actuator indicates that the second actuator has moved less than a predetermined amount during a predetermined period.

8. The method of claim 7, wherein the first actuator is an electric motor configured to rotate and move the second actuator.

9. The method of claim 8, wherein the parameter for the electric motor that is indicative of the movement of the second actuator is a number of revolutions of the electric motor.

10. The method of claim 9, wherein the number of revolutions of the electric motor are measured using at least one position sensor.

11. The method of claim 8, wherein the parameter for the electric motor that is indicative of the movement of the second actuator includes (i) a direction of the electric motor and (ii) a displacement of the electric motor.

12. The method of claim 11, wherein (i) the direction of the electric motor and (ii) the displacement of the electric motor are both measured using a quadrature sensor.

13. The method of claim 4, further comprising storing, at the controller, a final position of the second actuator at a memory.

14. The method of claim 13, further comprising:
- in response to the second actuator reaching the maximum disengagement position, determining, at the controller, a distance traveled by the second actuator from the maximum engagement or full engagement positions to the maximum disengagement position; and
- outputting, at the controller, a fault when the distance traveled by the second actuator is not within a predetermined tolerance.

15. The method of claim 4, wherein the non-park gear is one of a neutral gear, a drive gear, and a reverse gear, and wherein the transmission is a shift-by-wire transmission.

16. A method for controlling a vehicle park lock system, comprising:
- receiving, at a controller for the park lock system for a transmission of the vehicle, the controller including one or more processors, a first request to calibrate the park lock system;
- commanding, by the controller, an electric motor to move an actuator from an initial position to a maximum engagement position in response to receiving the first request, the electric motor being configured to move the actuator, the actuator being configured to engage/disengage a park pawl of the park lock system with a park gear of a transmission of the vehicle, the maximum engagement position indicating a maximum engagement of the park pawl with the park gear;
- determining, at the controller, a full engagement position for the actuator based on the maximum engagement position, the full engagement position indicating full engagement of the park pawl with the park gear but less than the maximum engagement of the park pawl with the park gear;
- commanding, by the controller, the electric motor to move the actuator from the maximum engagement position to the full engagement position;
- receiving, at the controller, a second request to transition the transmission from the park gear to a non-park gear of the transmission;
- commanding, by the controller, the electric motor to move the actuator from the full engagement position to a maximum disengagement position in response to receiving the second request, the maximum disengagement position indicating a maximum disengagement of the park pawl from the park gear;
- determining, at the controller, a full disengagement position for the actuator based on the maximum disengagement position, the full disengagement position indicating full disengagement of the park pawl from the park gear but less than the maximum disengagement of the park pawl from the park gear; and
- controlling, by the controller, the electric motor to move the actuator to engage/disengage the park pawl with/from the park gear using the full engagement position and the full disengagement position, respectively.

17. The method of claim 16, wherein commanding the electric motor to move the actuator from the initial position to the maximum engagement position includes:
- commanding, by the controller, the electric motor to move the actuator at a predetermined velocity from the initial position in a first direction corresponding to engagement of the park pawl with the park gear;
- monitoring, at the controller, at least one of a current drawn by the electric motor and a parameter of the electric motor that is indicative of the movement of the actuator; and
- commanding, by the controller, the electric motor to stop moving the actuator based on the monitoring to obtain the maximum engagement position.

18. The method of claim 17, wherein commanding the electric motor to move the actuator from the full engagement position to the maximum disengagement position includes:
- commanding, by the controller, the electric motor to move the actuator at the predetermined velocity from the full engagement position in a second direction corresponding to disengagement of the park pawl from the park gear;

monitoring, at the controller, at least one of the current drawn by the electric motor and the parameter of the electric motor that is indicative of the movement of the actuator; and commanding, by the controller, the electric motor to stop moving the actuator based on the monitoring to obtain the maximum disengagement position.

19. The method of claim 18, wherein commanding the electric motor to stop moving the actuator to obtain the maximum engagement position and the maximum disengagement position is performed when at least one of (i) the current drawn by the electric motor exceeds a predetermined current and (ii) the parameter for the electric motor that is indicative of the movement of the actuator indicates that the actuator has moved less than a predetermined amount during a predetermined period.

20. The method of claim 19, wherein the parameter for the electric motor that is indicative of the movement of the actuator includes at least one of (i) a direction of the electric motor and (ii) a displacement of the electric motor.

* * * * *